United States Patent [19]
Sakai

[11] 3,946,118

[45] Mar. 23, 1976

[54] PROCESS FOR RETAINING FRESHNESS OF FRUITS, VEGETABLES AND CEREALS

[76] Inventor: Isao Sakai, 2-11, Nishiogi Minami 1-chome, Suginam, Tokyo, Japan

[22] Filed: June 24, 1975

[21] Appl. No.: 590,016

[30] Foreign Application Priority Data
June 29, 1974 Japan................................ 49-74597

[52] U.S. Cl. ................. 426/321; 426/331; 426/419
[51] Int. Cl.²........................ A23B 7/00; A23B 9/00
[58] Field of Search ........... 426/267, 270, 321, 331, 426/263, 312, 419

[56] References Cited
UNITED STATES PATENTS

| | | | |
|---|---|---|---|
| 3,101,271 | 8/1963 | Croall | 426/267 |
| 3,545,982 | 12/1970 | Nakatani et al. | 426/321 X |

*Primary Examiner*—A. Louis Monacell
*Assistant Examiner*—R. A. Yoncoskie

[57] ABSTRACT

The freshness of fruits, vegetables and cereals can be retained by storing or transporting these foods in the presence of a minor amount of calcium peroxide.

2 Claims, No Drawings

PROCESS FOR RETAINING FRESHNESS OF FRUITS, VEGETABLES AND CEREALS

This invention relates to a process for retaining freshness of fruits, vegetables and cereals.

Most fruits, vegetables and cereals produce gaseous ethylene and carbon dioxide during storage. It is said that such gaseous ethylene and carbon dioxide promote the ripening of the above foods and, thus, hasten the deterioration or perishing thereof. For example, Nagano Prefecture Horticultural Experimental Station reported that the freshness of apples can be retained, i.e. the sarcocarp retains its stiffness and they do not turn stale, for a long period of time when carbon dioxide and oxygen are present at concentrations of less than 1% and approximately 10%, respectively. However, the sarcocarp becomes brown and deteriorated when the amount of carbon dioxide increases to a concentration of 12 to 20%.

In order to retain the freshness of bananas, some proposals have been heretofore reported. For example, bananas were transported and stored in the presence of potassium permanganate in Australia and active carbon in Taiwan. However, these proposals are not satisfactory, because both potassium permanganate and active carbon does not selectively absorb or remove carbon dioxide and ethylene and the function of absorbing or removing carbon dioxide and ethylene does not last for a long period of time.

Therefore, it is an object of the present invention to provide a process whereby the freshness of fruits, vegetables and cereals can be retained for a long period of time.

In accordance with the present invention, there is provided a process for retaining the freshness of fruits, vegetables and cereals which comprises storing or transporting the afore-said foods in the presence of calcium peroxide.

By the term "fruits, vegetables and cereals" used herein is meant fruits, vegetables and cereals which produce gaseous ethylene and carbon dioxide during storage or transportation and, therefore, their deterioration or perishing are hastened. Such foods include, for example, fruits such as bananas and apples, vegetables such as green vegetables, potatoes and mushrooms, and cereals such as rough rice, wheat and soybean.

The calcium peroxide used may be either technical or formulated. Commercially available are those, for example, CALPER (trade name, supplied by NIPPON Peroxide Co., Ltd.), which contain approximately 54% by weight of $CaO_2$ and the active oxygen of which is approximately 12% by weight.

The calcium peroxide used may be either in the form of finely divided powders or granules. It is preferable to dehydrate or dry calcium peroxide before its use. The manner whereby the finely divided powders or granules of calcium peroxide is used is not critical. However, it is preferable that these powders or granules are not in contact with the food, although calcium peroxide does not exert a special, undersirable influence on the food. Usually, these powders or granules are placed in a small bag or other vessel prior to use. They may also be used in the form of a thin layer, which is placed inside a small bag or which is sandwiched between two pieces of paper.

The calcium peroxide powders or granules in the afore-said forms are placed in storehouses and shipholds used for storage or transportation of the foods. They also may be placed in bags and other types of containers used for storage or transportation of the food. Further, they also may be placed in a refrigerator. In such a case, calcium peroxide performs the functions of not only retaining the freshness of the foods but also deodorizing the foods. If desired, conventional germicides and/or insecticides may be used together therewith.

It is presumed that calcium peroxide removes ethylene and carbon dioxide, which are produced from the food, by the following reaction mechanism. That is, calcium peroxide produces oxygen and is converted into slacked line due to moisture present, and the oxygen reacts with ethylene and the calcium hydroxide catches carbon dioxide.

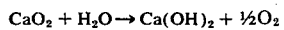

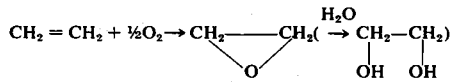

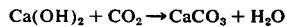

The convertion of calcium peroxide into calcium hydroxide and oxygen occurs by very slow degrees. The amount of oxygen is such that the amount of oxygen produced from 1g of calcium peroxide is capable of reacting with 2.5 ml of gaseous ethylene having a pressure of 0.1 atm. Further, the afore-said foods produce ethylene and carbon dioxide at very low rates, e.g. it is said that 1kg of banana produces approximately 1 mg of ethylene and approximately 1.7 mg of carbon dioxide. Therefore, the freshness of the afore-said foods can be retained for a long period of time, usually for approximately two months or more.

The amount of calcium peroxide used varies depending upon the particular food and the period for which the food is stored or transported. In general its amount may be within the range from 1 to 50 g, preferably 10 to 30 g, per Kg of the food.

The invention will be illustrated by the following example.

EXAMPLE 1

Approximately 5 kg of unripened bananas produced in the Philippines were placed in each of several rooms having a 3 m³ volume and maintained at 15°C. Various freshness-retaining agents shown in the Table below were also placed in the rooms one at a time, each agent being put inside a polyethylene bag of a 25 cm × 50 cm size. The freshness of the bananas was observed. This test was carried out three times for each agent, wherein each freshness-retaining agent was used in an amount of 5g, 10g and 15g, respectively. Averages of the three test results were as shown in the following table 1.

Table 1

| Run No. | Freshness-retaining agents | Results |
|---|---|---|
| 1. | Calcium peroxide *1 | Greenish tint and stiff after 62 days |
| 2. | Potassium permanganate | Yellow and soft after 25 days |
| 3. | Potassium permanganate + soda lime (1:1 by wt.) | Yellow and soft after 30 days |
| 4. | Palladium chloride | Yellow and soft after 16 days |
| 5. | Palladium chloride | Yellow and soft after 18 days |

Table 1-continued

| Run No. | Freshness-retaining agents | Results* |
|---|---|---|
| | + soda lime (1:1 by wt.) | |
| 6. | none | Yellow and soft after 4 or 5 days |

*1 Finely divided powders having an apparent specific gravity of approximately 0.65, and an effective oxygen content of approximately 12%.

EXAMPLE 2

KYOHO (a kind of grapes, grown in Yamanashi Prefecture, Japan) were harvested on Sept. 15, 1973 and put into polyethylene bags of 25 cm × 50 cm size on the same day. The amount of grapes was 20 bunches per bag. 5 g of calcium peroxide sandwiched between hygroscopic papers of a 20 cm length, a 10 cm width and 1 mm thickness, were placed between the bunches of grapes and the bottom of each bag. Each bag was closed by a rubber ring and stored at 5°C over a period of 76 days, i.e. until Nov. 30, 1973. The percent reduction in weight of grapes and the percent separation of grapes were determined according to the following formulae, respectively.

% Reduction in weight = (weight after storage/weight before storage) × 100

% Separation = (weight of grapes separated from bunch/total weight of grapes) × 100

Results are shown in Table 2.

Table 2

| Run No. | Freshness-retaining agent | % Reduction in weight | % Separation |
|---|---|---|---|
| 1. | Calcium peroxide | 2.1 | 4.8 |
| 2. | none | 10.3 | 28.2 |

EXAMPLE 3

Sticks of asparagus (Mary-Washington, grown in Nagano Prefecture, Japan) were harvested in June and put into bags of 50 cm × 15 cm size on the same day. The amount of asparagus was 200 g per bag. 3 g of calcium peroxide sandwiched between hygroscopic papers of a 10 cm length, a 5 cm width and a 1 mm thickness were placed between the sticks of asparagus and the bottom of each bag. 20 bags of the sticks of asparagus were packed in a corrugated card board box of a 4kg capacity, and stored at a temperature of 18° to 20°C for 7 days. The percent of reduction in weight and the percent of bruising were determined. The percent of bruising is expressed by the following formula.

% Bruising = (weight of asparagus bruised/total weight of asparagus) × 100

Results are shown in Table 3.

Table 3

| Run No. | Freshness-retaining agent | % Reduction in weight | % Bruising |
|---|---|---|---|
| 1 | Calcium peroxide | 5 | 0 |
| 2 | none | 50 | 40 |

EXAMPLE 4

Several polyethylene bags were each filled with 500 g of soybeans (Norin No. 2). 10 g of calcium peroxide sandwiched between thick hygroscopic papers were also put into each of the bags. Each bag was closed by a rubber ring and stored over a period of 10 months. The average temperature and the average relative humidity were approximately 20°C and 55% RH, respectively. After the storing, the soybeans were tested for their average percent of germination in a conventional manner. For comparison purposes the above procedure was repeated wherein no calcium peroxide was used. Results were shown in Table 4.

Table 4

| Run No. | Freshness-retaining agent | Average % of germination |
|---|---|---|
| 1 | Calcium peroxide | 92.5 |
| 2 | none | 70.8 |

The high percentage of germination means that calcium peroxide was effective for retaining the freshness of the soybeans.

What we claim is:

1. A process for retaining the freshness of fruits, vegetables and cereals which comprises storing or transporting the afore-said foods in the presence of an amount of calcium peroxide effective to retain their freshness.

2. A process according to claim 1 wherein said amount of calcium peroxide is 1 to 50 g per Kg of said foods.

* * * * *